US009330679B2

(12) United States Patent
Suzuki et al.

(10) Patent No.: US 9,330,679 B2
(45) Date of Patent: May 3, 2016

(54) VOICE PROCESSING DEVICE, VOICE PROCESSING METHOD

(71) Applicant: FUJITSU LIMITED, Kawasaki-shi, Kanagawa (JP)

(72) Inventors: Masanao Suzuki, Yokohama (JP); Takeshi Otani, Kawasaki (JP); Taro Togawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 14/074,511

(22) Filed: Nov. 7, 2013

(65) Prior Publication Data

US 2014/0163979 A1 Jun. 12, 2014

(30) Foreign Application Priority Data

Dec. 12, 2012 (JP) ................................ 2012-270916

(51) Int. Cl.

*G10L 15/00* (2013.01)
*G10L 21/04* (2013.01)
*G10L 21/00* (2013.01)
*H04N 5/76* (2006.01)
*H04M 1/64* (2006.01)
*H04J 3/16* (2006.01)

(52) U.S. Cl.

CPC ..................................... *G10L 21/04* (2013.01)

(58) Field of Classification Search

USPC ................. 704/233, 226, 249, 503, 206, 208; 379/88.01; 370/468; 348/231.4

See application file for complete search history.

(56) References Cited

U.S. PATENT DOCUMENTS 3,700,820 A * 10/1972 Blasbalg ................... G06F 3/00 370/468
4,167,653 A * 9/1979 Araseki et al. ................ 704/233
5,794,201 A 8/1998 Nejime et al.
6,377,915 B1 * 4/2002 Sasaki ..................... G10L 19/04 704/206
8,364,471 B2 * 1/2013 Yoon ..................... G10L 19/028 704/206
9,142,222 B2 * 9/2015 Lee ......................... G10L 19/24
2002/0032571 A1 * 3/2002 Leung ................. G10L 21/0364 704/503
2005/0234715 A1 * 10/2005 Ozawa .......................... 704/226
2007/0118363 A1 5/2007 Sasaki et al.

(Continued)

FOREIGN PATENT DOCUMENTS

DE 4227826 2/1993
EP 0 534 410 3/1993

(Continued)

OTHER PUBLICATIONS

European Search Report issued Feb. 3, 2014 for European Application No. 13192457.3.
Tomono Miki et al., "Development of Radio and Television Receiver with Speech Rate Conversion Technology", CASE#10-03, p. 1-29, Institute of Innovation Research, Hitotsubashi University, Apr. 2010.

*Primary Examiner* — Jialong He
*Assistant Examiner* — Neeraj Sharma
(74) *Attorney, Agent, or Firm* — Staas & Halsey LLP

(57) ABSTRACT

A voice processing device includes: a processor; and a memory which stores a plurality of instructions, which when executed by the processor, cause the processor to execute, receiving a first signal including a plurality of voice segments; controlling such that a non-voice segment with a length equal to or greater than a predetermined first threshold value exists between at least one of the plurality of voice segments; and outputting a second signal including the plurality of voice segments and the controlled non-voice segment.

14 Claims, 13 Drawing Sheets

(56) References Cited

U.S. PATENT DOCUMENTS

| | | | | |
|---|---|---|---|---|
| 2009/0086934 | A1* | 4/2009 | Thomas | 379/88.01 |
| 2009/0248409 | A1* | 10/2009 | Endo et al. | 704/226 |
| 2011/0264447 | A1* | 10/2011 | Visser | G10L 25/78 704/208 |
| 2012/0127343 | A1* | 5/2012 | Park | G10L 21/0208 348/231.4 |
| 2013/0006622 | A1* | 1/2013 | Khalil et al. | 704/233 |
| 2014/0288925 | A1* | 9/2014 | Sverrisson | G10L 21/038 704/206 |

FOREIGN PATENT DOCUMENTS

| | | |
|---|---|---|
| EP | 1 515 310 | 3/2005 |
| EP | 1 840 877 | 10/2007 |
| JP | 2000-349893 | 12/2000 |
| JP | 2001-211469 | 8/2001 |
| JP | 2008-58956 | 3/2008 |
| JP | 2009-75280 | 4/2009 |
| JP | 4460580 | 5/2010 |
| WO | WO 02/082428 | 10/2002 |

* cited by examiner

VOICE PROCESSING DEVICE, VOICE PROCESSING METHOD

CROSS-REFERENCE TO RELATED APPLICATION

This application is based upon and claims the benefit of priority from the prior Japanese Patent Application No. 2012-270916 filed on Dec. 12, 2012, the entire contents of which are incorporated herein by reference.

FIELD

The embodiments discussed herein are related to, for example, a voice processing device configured to control an input signal, a voice processing method, and a voice processing program.

BACKGROUND

A method is known to control a voice signal given as an input signal such that the voice signal is easy to listen. For example, for aged people, a voice recognition ability may be degraded due to a reduction in hearing ability or the like with aging. Therefore, it tends to become difficult for aged people to hear voices when a talker speaks at a high speech rate in a two-way voice communication using a portable communication terminal or the like. A simplest way to handle the above situation is that a talker speaks “slowly” and “clearly”, as disclosed, for example, in Tomono Miki et al., “Development of Radio and Television Receiver with Speech Rate Conversion Technology”, CASE#10-03, Institute of Innovation Research, Hitotsubashi University, April, 2010. In other words, it is effective that a talker speaks slowly word by word with a clear pause between words and between phrases. However, in two-way voice communications, it may be difficult to ask a talker, who usually speaks fast, to intentionally speak “slowly” and “clearly”. In view of the above situation, for example, Japanese Patent No. 4460580 discloses a technique in which voice segments of a received voice signal are detected and extended to improve audibility thereof, and furthermore, non-voice segments are shortened to reduce a delay caused by the extension of voice segments. More specifically, when an input signal is given, a voice segment, that is, an active speech segment and a non-voice segment, that is, a non-speech segment in the given input signal are detected, and voice samples included in the voice segment are repeated periodically thereby controlling the speech rate to be lowered without changing the speech pitch of a received voice and thus achieving an improvement in easiness of listening. Furthermore, by shortening a non-voice segment between voice segments, it is possible to minimize a delay caused by the extension of the voice segments so as to suppress sluggishness resulting from the extension of the voice segments thereby allowing the two-way voice communication to be natural.

SUMMARY

In accordance with an aspect of the embodiments, a voice processing device includes: a processor; and a memory which stores a plurality of instructions, which when executed by the processor, cause the processor to execute, receiving a first signal including a plurality of voice segments; controlling such that a non-voice segment with a length equal to or greater than a predetermined first threshold value exists between at least one of the plurality of voice segments; and outputting a second signal including the plurality of voice segments and the controlled non-voice segment.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

The voice processing device disclosed in the present description is capable of improving the easiness for a listener to hear a voice.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Embodiments of a voice processing device, a voice processing method, and a voice processing program are described in detail below with reference to drawings. Note that the embodiments described below are only for illustration and not for limitation.

Figure 1A:
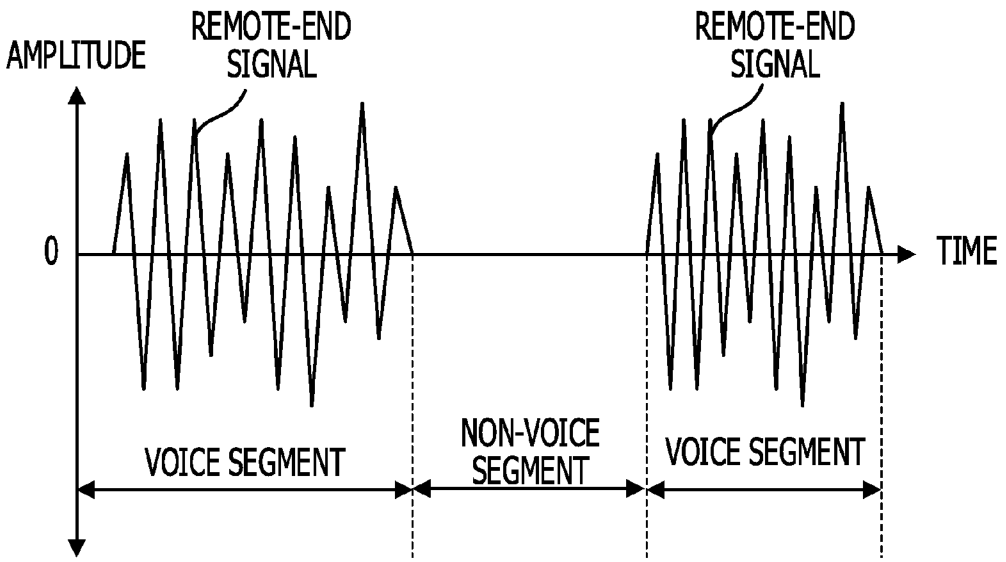
FIG. 1A is a diagram illustrating a relationship between a time and an amplitude of a remote-end signal transmitted from a transmitting side.
Figure 1B:
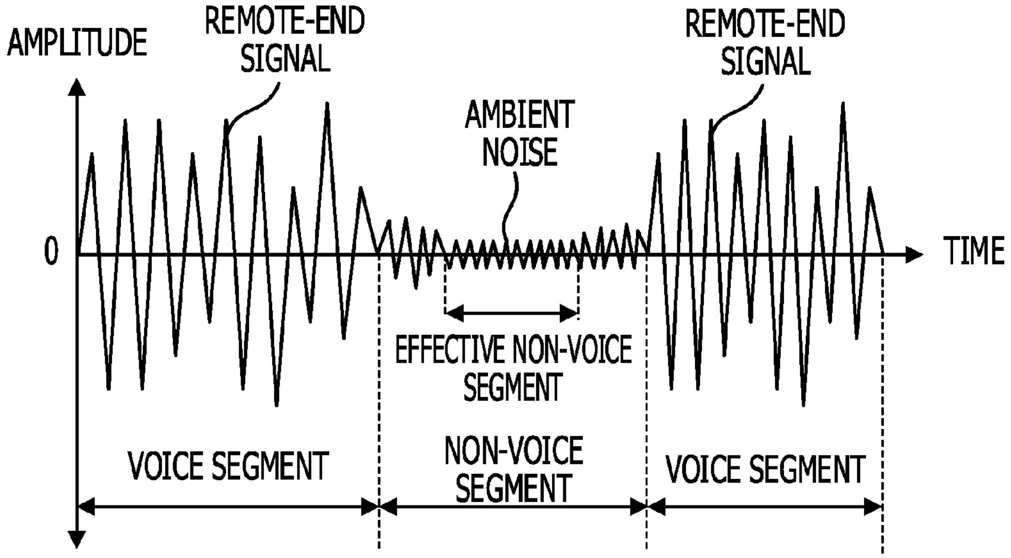
FIG. 1B is a diagram illustrating a relationship between a time and an amplitude of a total signal which is a mixture of a remote-end signal transmitted from a transmitting side and ambient noise at a receiving side.

In the above-described method of controlling the speech rate, only a reduction in speech rate is taken into account, and no consideration is taken on an improvement of clarity of voices by making a clear pause in speech, and thus the above-described method is not sufficient in terms of improvement in audibility. Furthermore, in the above-described technique of controlling the speech rate, non-voice segments are simply reduced regardless of whether there is ambient noise on a near-end side where a listener is located. However, in a case where a two-way communication is performed in a situation in which a listener is in a noisy environment (in which there is ambient noise), the ambient noise may make it difficult to hear a voice. FIG. 1A illustrates an example of an amplitude of a remote-end signal transmitted from a transmitting side, where the amplitude varies with time. FIG. 1B illustrates a total signal which is a mixture of a remote-end signal transmitted from a transmitting side and ambient noise at a receiving side, where the amplitude of the total signal varies with time. In FIGS. 1A and 1B, a determination as to whether the remote-end signal is in an active or non-voice segment may be made, for example, as follows. That is, when the amplitude of the remote-end signal is smaller than an arbitrarily determined threshold value, then it is determined that the remote-end signal is in a non-voice segment. On the other hand, when the amplitude of the remote-end signal is equal to or greater than the threshold value, then it is determined that the remote-end signal is in a voice segment. In FIG. 1B, there is ambient noise in the non-voice segment in FIG. 1A. Note that there is also background noise non-voice segments in FIG. 1B, but the amplitude of the background noise is much smaller than the amplitude of the remote-end signal, and thus the amplitude of the background noise in the voice segments are not illustrated.

In view of the above, the inventors have contemplated factors that may make it difficult to hear voices in two-way communications in an environment in which there is noise at a receiving side where a near-end signal is generated, as described below. As illustrated in FIG. 1B, there is an overlap between an end part of a voice segment and a starting part of ambient noise in a non-voice segment, which makes it difficult to clearly distinguish between an end of the remote-end signal and a start of the ambient noise in the non-voice segment. Only after a listener has perceived ambient noise continuing for a certain period, the listener notices that the listener is hearing not a remote-end signal but ambient noise. In this case, an effective non-voice segment recognized by the listener is smaller in length than a real non-voice segment illustrated in FIG. 1A, which makes a boundary of the voice segment vague and thus a reduction in easiness of listening (audibility) occurs. The greater the ambient noise is, the closer the amplitude of the remote-end signal is to the amplitude of the ambient, and thus the shorter the effective non-voice segment becomes, which leads to a greater reduction in the easiness of hearing voices.

First Embodiment

Figure 2:
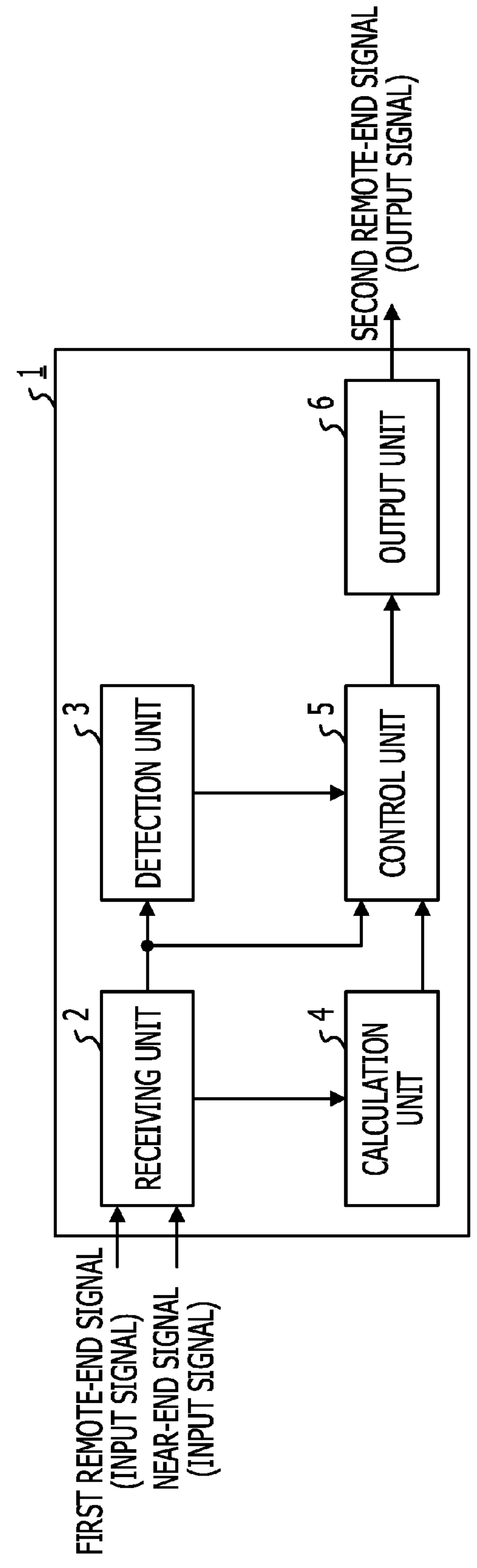
FIG. 2 is a functional block diagram of a voice processing device according to an embodiment.

FIG. 2 is a functional block diagram illustrating a voice processing device 1 according to an embodiment. The voice processing device 1 includes a receiving unit 2, a detection unit 3, a calculation unit 4, a control unit 5, and an output unit 6.

The receiving unit 2 is realized, for example, by a wired logic hardware circuit. Alternatively, the receiving unit 2 may be a function module realized by a computer program executed in the voice processing device 1. The receiving unit 2 acquires, from the outside, a near-end signal transmitted from a receiving side (a user of the voice processing device 1) and a first remote-end signal including an uttered voice transmitted from a transmitting side (a person communicating with the user of the voice processing device 1). The receiving unit 2 may receive the near-end signal, for example, from a microphone (not illustrated) connected to or disposed in the voice processing device 1. The receiving unit 2 may receive the first remote-end signal via a wired or wireless circuit, and may decode the first remote-end signal using decoder unit (not illustrated) connected to or disposed in the voice processing device 1. The receiving unit 2 outputs the received first remote-end signal to the detection unit 3 and the control unit 5. The receiving unit 2 outputs the received near-end signal to the calculation unit 4. Here, it is assumed by way of example that the first remote-end signal and the near-end signal are input to the receiving unit 2, for example, in units of frames each having a length of about 10 to 20 milliseconds and each including a particular number of voice samples (or ambient noise samples). The near-end signal may include ambient noise at the receiving side.

The detection unit 3 is realized, for example, by a wired logic hardware circuit. Alternatively, the detection unit 3 may be a function module realized by a computer program executed in the voice processing device 1. The detection unit 3 receives the first remote-end signal from the receiving unit 2. The detection unit 3 detects a non-voice segment length and a voice segment length included in the first remote-end signal. The detection unit 3 may detect a non-voice segment length and a voice segment length, for example, by determining whether each frame in the first remote-end signal is in a voice segment or a non-voice segment. An example of a method of determining whether a given frame is a voice segment or a non-voice segment is to subtract an average power of input voice sample calculated for past frames from a voice sample power of the current frame thereby determining a difference in power, and compare the difference in power with a threshold value. When the difference is equal to or greater than the threshold value, the current frame is determined as a voice segment, but when the difference is smaller than the threshold value, the current frame is determined as a non-voice segment. The detection unit 3 may add associated information to the detected voice segment length and the non-voice segment length in the first remote-end signal. More specifically, for example, the detection unit 3 may add associated information to the detected voice segment length in the first remote-end signal such that a frame number f(i) of a frame included in the voice segment length and a flag of voice activity detection (hereinafter referred to as flag vad) set to 1 (flag vad=1) to indicate that the frame is in the voice segment are added to the voice segment length. The detection unit 3 may add associated information to the detected non-voice segment length in the first remote-end signal such that a frame number f(i) of a frame included in the non-voice segment length and a flag vad set to =0 (flag vad=0) to indicate that the frame is in the non-voice segment are added to the non-voice segment length. As for the method of detecting a voice segment and a non-voice segment in a given frame, various known methods may be used. For example, a method disclosed in Japanese Patent No. 4460580 may be employed. The detection unit 3 outputs the detected voice segment length and the non-voice segment length in the first remote-end signal to the control unit 5.

The calculation unit 4 is realized, for example, by a wired logic hardware circuit. Alternatively, the calculation unit 4 may be a function module realized by a computer program executed in the voice processing device 1. The calculation unit 4 receives the near-end signal from the receiving unit 2. The calculation unit 4 calculates a noise characteristic value of ambient noise included in the near-end signal. The calculation unit 4 outputs the calculated noise characteristic value of the ambient noise to the control unit 5.

An example of a method of calculating the noise characteristic value of ambient noise by the calculation unit 4 is described below. First, the calculation unit 4 calculates near-end signal power (S(i)) from the near-end signal (Sin). For example, in a case where each frame of the near-end signal (Sin) includes 160 samples (with a sampling rate of 8 kHz), the calculation unit 4 calculates the near-end signal power (S(i)) according to a formula (1) described below.

$$S(i) = 10\log_{10}\left(\sum_{t=1}^{160} \mathrm{Sin}(t)^2\right) \tag{1}$$

Next, the calculation unit 4 calculates the average near-end signal power (S_ave(i)) from the near-end signal power (S(i)) of the current frame (i-th frame). For example, the calculation unit 4 calculation the average near-end signal power (S_ave (i)) for past 20 frames according to a formula (2) described below.

$$\mathrm{S\_ave}(i) = \frac{1}{20}\sum_{j=1}^{j=20} S(i-j) \tag{2}$$

The calculation unit 4 then compares the difference near-end signal power (S_dif(i)) defined by the difference between the near-end signal power (S(i)) and the average near-end signal power (S_ave(i)) with an ambient noise level threshold value (TH_noise). When the difference near-end signal power (S_dif(i)) is equal to or greater than the ambient noise level threshold value (TH_noise), the calculation unit 4 determines that the near-end signal power (S(i)) indicates an ambient noise value (N). Herein, the ambient noise value(N) may be referred to as a noise characteristic value of the ambient noise. The ambient noise level threshold value (TH_noise) may be set to an arbitrary value in advance such that, for example, TH_noise=3 dB.

In a case where the difference near-end signal power (S_dif (i)) is equal to or greater than the ambient noise level threshold value (TH_noise), the calculation unit 4 may update the ambient noise value (N) using a formula (3) described below $$N(i)=N(i-1) \tag{3}$$

On the other hand, in a case where the difference near-end signal power (S_dif(i)) is smaller than the ambient noise level threshold value (TH_noise), the calculation unit 4 may update the ambient noise value (N) using a formula (4) described below.

$$N(i)=\alpha\times S(i)+(1-\alpha)\times N(i-1) \tag{4}$$

where $\alpha$ is an arbitrarily defined particular value in a range from 0 to 1. For example, $\alpha$=0.1. An initial value N(0) of the ambient noise value (N) may also be set arbitrarily to a particular value, such as, for example, N(0)=0.

The control unit 5 illustrated in FIG. 2 is realized, for example, by a wired logic hardware circuit. Alternatively, the control unit 5 may be a function module realized by a computer program executed in the voice processing device 1. The control unit 5 receives the first remote-end signal from the receiving unit 2, and receives the voice segment length and the non-voice segment length of this first remote-end signal from the detection unit 3, and furthermore receives the noise characteristic value from the calculation unit 4. The control unit 5 produces a second remote-end signal by controlling the first remote-end signal based on the voice segment length, the non-voice segment length, and the noise characteristic value, and outputs the resultant second remote-end signal to the output unit 6.

Figure 3:
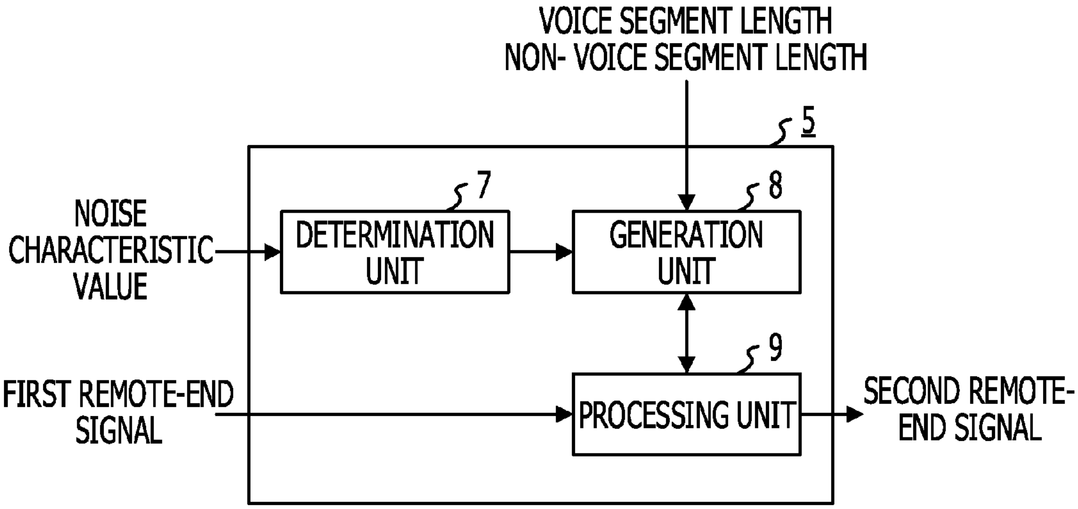
FIG. 3 is a functional block diagram of a control unit according to an embodiment.

The process of controlling the first remote-end signal by the control unit 5 is described in further detail below. FIG. 3 is a functional block diagram of the control unit 5 according to an embodiment. The control unit 5 includes a determination unit 7, a generation unit 8, and a processing unit 9. The control unit 5 may not include the determination unit 7, the generation unit 8, and the processing unit 9, but, instead, functions of the respective units may be realized by one or more wired logic hardware circuits. Alternatively, functions of the units in the control unit 5 may be realized as function modules achieved by a computer program executed in the voice processing device 1 instead of being realized by one or more wired logic hardware circuits.

Figure 4:
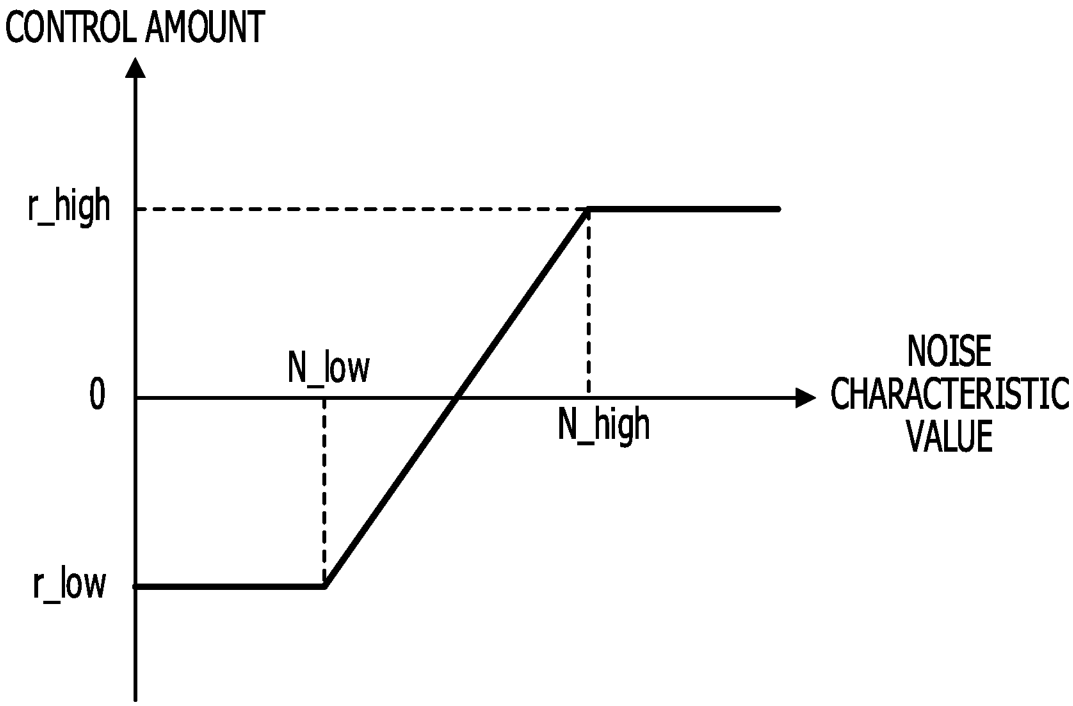
FIG. 4 is a diagram illustrating a relationship between a noise characteristic value and a control amount of a non-voice segment length.

In FIG. 3, the noise characteristic value input to the control unit 5 is applied to the determination unit 7. The determination unit 7 determines a control amount (non_sp) of the non-voice segment length based on the noise characteristic value. FIG. 4 illustrates a relationship between the noise characteristic value and the control amount of the non-voice segment length. In FIG. 4, in a case where the control amount represented in a vertical axis is equal to or greater than 0, a non-voice segment is added, depending on the control amount, to non-voice segment and thus the non-voice segment length is extended. On the other hand, in a case where the control amount is lower than 0, the non-voice segment is reduced depending on the control amount. In FIG. 4, r_high indicates an upper threshold value of the control amount (non_sp), and r_low indicates a lower threshold value of the control amount (non_sp). The control amount is a value by which the non-voice segment length is to be multiplied and which may be within a range from a lower limit of −1.0 to an upper limit of 1.0. Alternatively, the control amount may be a value indicating a non-voice time length arbitrarily determined within a range equal to or greater than a lower limit which may be set to 0 seconds or a value such as 0.2 seconds above which it is allowed to distinguish between words represented by respective voice segments even in a situation in which there is ambient noise at a receiving side. In this case, the non-voice segment length is replaced by the non-voice time length. Note that the example value of 0.2 seconds of the non-voice segment length above which it is allowed for a listener to distinguish between words represented by respective voice segments may be referred to as a first threshold value. Furthermore, referring again to the relationship diagram illustrated in FIG. 4, in a range of the noise characteristic value from N_low to N_high, the straight line may be replaced by a quadratic curve or a sigmoid curve whose value varies gradually along a curve around N_low and N_high.

As illustrated in the relationship diagram in FIG. 4, the determination unit 7 determines the control amount (non_sp) such that when the noise characteristic value is small, the non-voice segment is reduced by a large amount, while when the noise characteristic value is large, the non-voice segment is reduced by a small amount. In other words, the determination unit 7 determines the control amount as follows. When the noise characteristic value is small, this means that the listener is in a situation in which the listener is allowed to easily hear a voice of a talker, and thus the determination unit 7 determines the control amount such that the non-voice segment is reduced. On the other hand, when the noise characteristic value is large, this means that the listener is in a situation in which it is not easy for the listener to hear a voice of a talker, and thus the determination unit 7 determines the control amount such that the reduction in non-voice segment is minimized or the non-voice segment is increased. The determination unit 7 outputs the control amount (non_sp) of the non-voice segment length to the generation unit 8. In a case where it is allowed not to consider a delay in two-way voice communications, the determination unit 7 (or the control unit 5) may not to reduce the non-voice segment length.

In FIG. 3, the generation unit 8 receives the control amount (non_sp) of the non-voice segment length from the determination unit 7 and receives the voice segment length and the non-voice segment length from the detection unit 3 in the control unit 5. The generation unit 8 in the control unit 5 receives the first remote-end signal from the receiving unit 2. Furthermore, the generation unit 8 receives a delay from the processing unit 9 which will be described later. The delay may be defined, for example, as a difference between the receiving amount of the first remote-end signal received by the receiving unit 2 and the output amount of the second remote-end signal is output by the output unit 6. Alternatively, the delay may be defined, for example, as a difference between the receiving amount of the first remote-end signal received by the processing unit 9 and the output amount of the second remote-end signal output by the processing unit 9. Hereinafter the first remote-end signal and the second remote-end signal will also be referred to respectively as a first signal and a second signal.

The generation unit 8 generates control information #1 (ctrl-1) based on the voice segment length, the non-voice segment length, the control amount (non_sp) of the non-voice segment length, and the delay, and the generation unit 8 outputs the generated control information #1 (ctrl-1), the voice segment length, and the non-voice segment length to the processing unit 9. Next, the process of producing the control information #1 (ctrl-1) by the generation unit 8 is described below. For the voice segment length, the generation unit 8 generates the control information #1(ctrl-1) as ctrl-1=0. Note that when ctrl-1=0, the control processing including the extension or the reduction is not performed on the first remote-end signal. On the other hand, for the non-voice segment length, the generation unit 8 generates the control information #1 (ctrl-1) by setting the control information #1 (ctrl-1) based on the control amount (non_sp) received from the determination unit 7, for example, such that ctrl-1=non_sp. In a case where in the non-voice segment length the delay is greater than an upper limit (delay_max) that may be arbitrarily determined in advance, the generation unit 8 may set the control information #1 (ctrl-1) such that ctrl-1=0 so that the delay is not further increased. The upper limit (delay_max) may be set to a value that is subjectively regarded as allowable in the two-way voice communication. For example, the upper limit (delay_max) may be set to 1 second.

Figure 5:
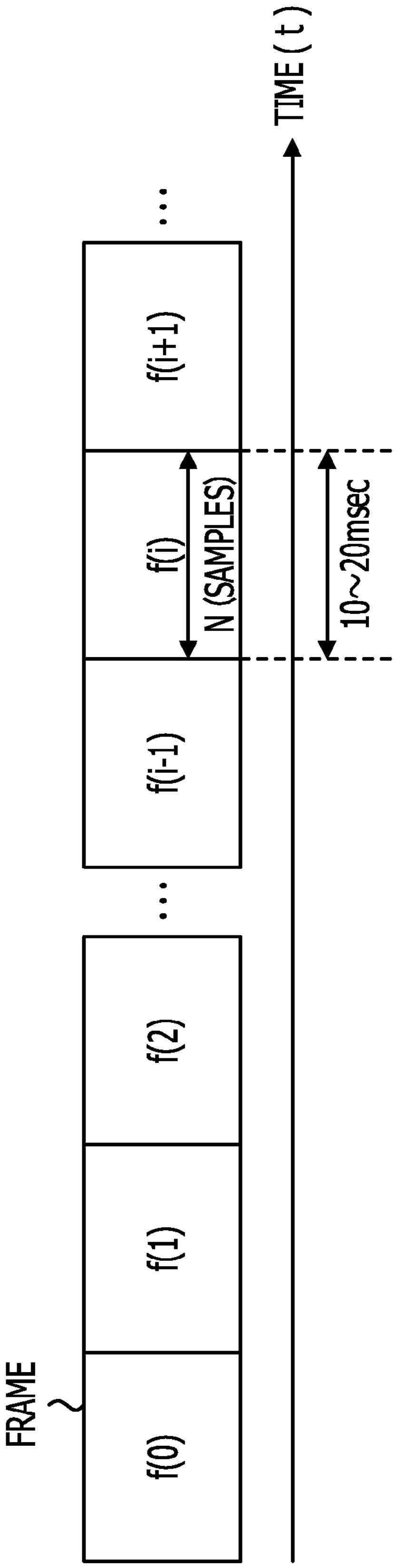
FIG. 5 is a diagram illustrating an example of a frame structure of a first remote-end signal.
Figure 6:
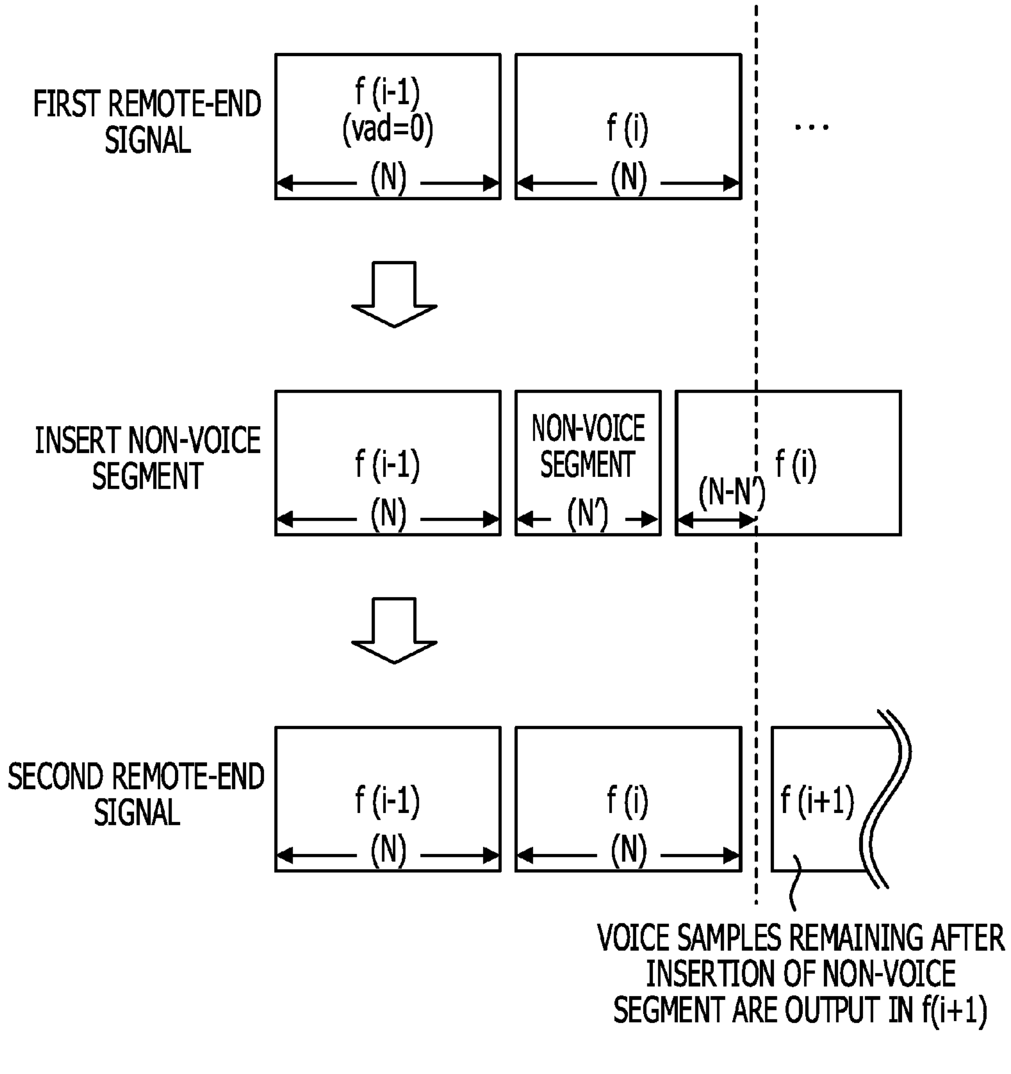
FIG. 6 is a diagram illustrating a concept of a process of increasing a non-voice segment length by a processing unit.

The processing unit 9 receives the control information #1 (ctrl-1), the voice segment length, and the non-voice segment length from the generation unit 8. The processing unit 9 also receives the first remote-end signal that is input to the control unit 5 from the receiving unit 2. The processing unit 9 outputs the above-described delay to the generation unit 8. The processing unit 9 controls the first remote-end signal where the control includes reducing or increasing of the non-voice segment. FIG. 5 illustrates an example of a frame structure of the first remote-end signal. As illustrated in FIG. 5, the first remote-end signal includes a plurality of frames each including a predetermined number, N, of voice samples. Next, a description is given below as to a control process performed by the processing unit 9 on an i-th frame of the first remote-end signal (a process of controlling a non-voice segment length of a frame with a frame number (f(i)) (such that the non-voice segment length is reduced or increased)), FIG. 6 illustrates a concept of an extension process on a non-voice segment length by the processing unit 9. As illustrated in FIG. 6, in a case where a current frame (f(i)) of the first remote-end signal is in a non-voice segment (vad=0), the processing unit 9 inserts a non-voice segment including N' samples at the top of the current frame. The number N' of samples may be determined based on the control information #1, that is, ctrl-1=non_sp, input from the generation unit 8. If the processing unit 9 inserts the non-voice segment including N' samples in the current frame (f(i)), then a segment including N-N' samples in the beginning of the frame f(i) follows the inserted non-voice segment. As a result, a total of N samples including N' frames of the inserted non-voice segment are output as samples of a new frame f(i) (in other words, as a second remote-end signal). N' samples remain in the i-th frame of the first remote-end signal after the non-voice segment is inserted, and these N' samples are output in a next frame (f(i+1)). A resultant signal obtained by performing the process of extending the non-voice segment length for the first remote-end signal is output as a second remote-end signal from the processing unit 9 in the control unit 5 to the output unit 6.

If the processing unit 9 inserts a non-voice segment in the first remote-end signal, part of the original first remote-end signal is delayed before being output. In view of this, the processing unit 9 may store a frame whose output is to be delayed in a buffer (not illustrated) or a memory (not illustrated) in the processing unit 9. In a case where the delay is estimated to be greater than a predetermined upper limit (delay_max), the extending of the non-voice segment may not be performed. On the other hand, in a case where there is a continuous non-voice segment length equal to or greater than a particular value (for example, 10 seconds), the processing unit 9 may perform a process of reducing the non-voice segment (described later) to reduce the non-voice segment length, which may reduce the generated delay.

Figure 7:
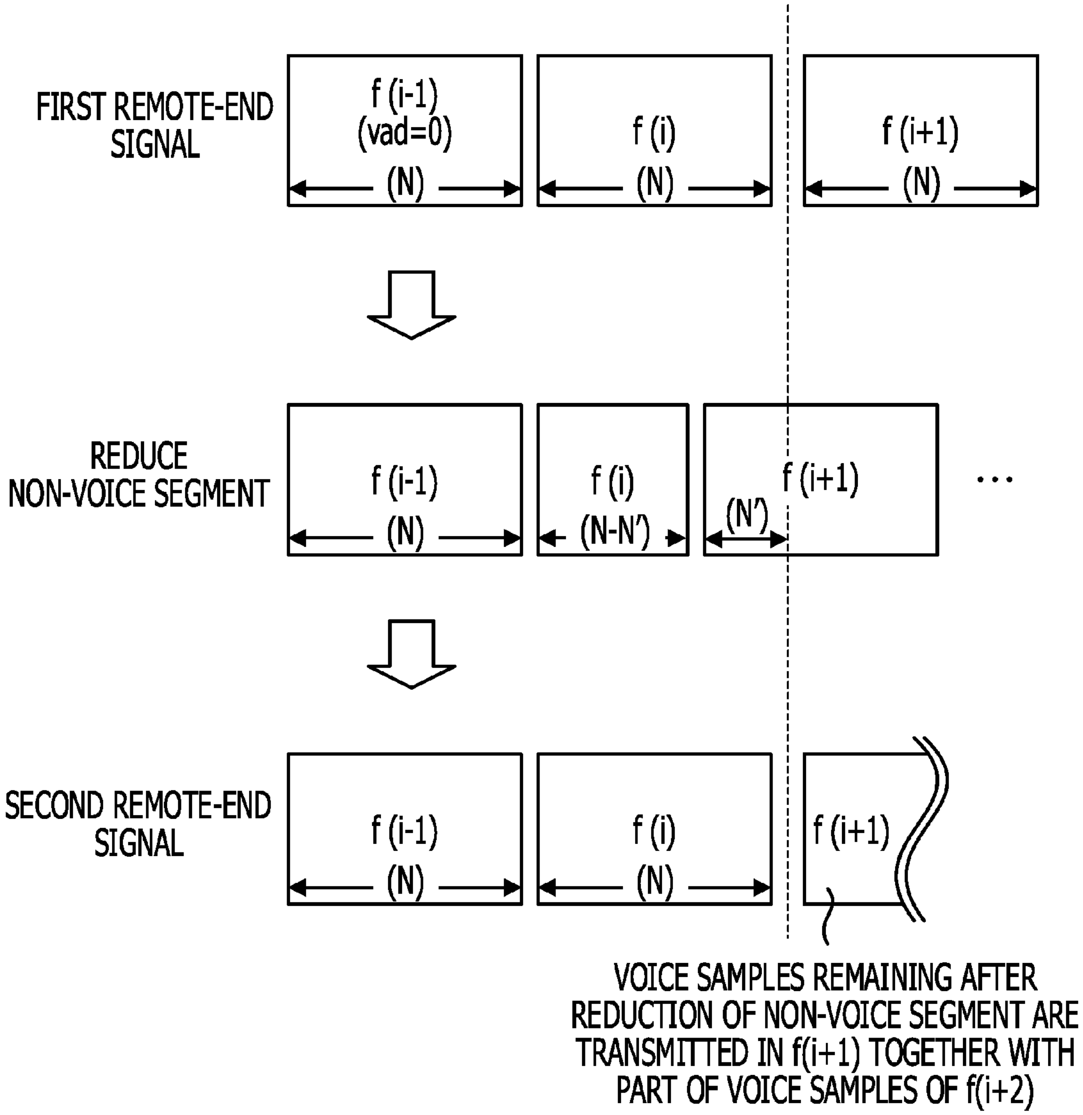
FIG. 7 is a diagram illustrating a concept of a process of reducing a non-voice segment length by a processing unit.

FIG. 7 is a diagram illustrating a concept of a process of reducing a non-voice segment length by the processing unit 9. As illustrated in FIG. 7, in a case where the current frame (f(i)) of the first remote-end signal is in a non-voice segment (vad=0) and the current non-voice segment is a continuation of a non-voice segment with a length equal to greater than a particular value, the processing unit 9 performs a process of reducing the non-voice segment of the current frame (f(i)). In the example illustrated in FIG. 7, the frame f(i) is in a non-voice segment. In a case where this non-voice segment is reduced by a sample length N', the processing unit 9 outputs only N-N' samples at the beginning of the current frame (f(i)) and discards the following N' samples in the current frame (f(i)). Furthermore, the processing unit 9 takes N' samples at the beginning of a following frame (f(i+1)) and outputs them as a remaining part of the current frame (f(i)). Note that remaining samples in the frame (f(i+1)) may be output in following frames.

The reducing of the non-voice segment length by the processing unit 9 results in a partial removal of the first remote-end signal, which provides an advantageous effect that the delay is reduced. However, there is a possibility that when the removed non-voice segment is equal to or greater than a particular value, a top or an end of a voice segment is lost. To handle such a situation, the processing unit 9 may calculate a time length of the continuous non-voice state since the beginning thereof to the current point of time, and store the calculated value in a buffer (not illustrated) or a memory (not illustrated) in the processing unit 9. Based on the calculated value, the processing unit 9 may control the reduction of the non-voice segment length such that the continuous non-voice time is not smaller than a particular value (for example, 0.1 seconds). Note that the processing unit 9 may vary the reduction ratio or the extension ratio of the non-voice segment depending on the age and/or the hearing ability of a user at the near-end side.

In FIG. 2, the output unit 6 is realized, for example, by a wired logic hardware circuit. Alternatively, the output unit 6 may be a function module realized by a computer program executed in the voice processing device 1. The output unit 6 receives the second remote-end signal from the control unit 5, and the output unit 6 outputs the received second remote-end signal as an output signal to the outside. More specifically, for example, the output unit 6 may provide the output signal to a speaker (not illustrated) connected to or disposed in the voice processing device 1.

Figure 8:
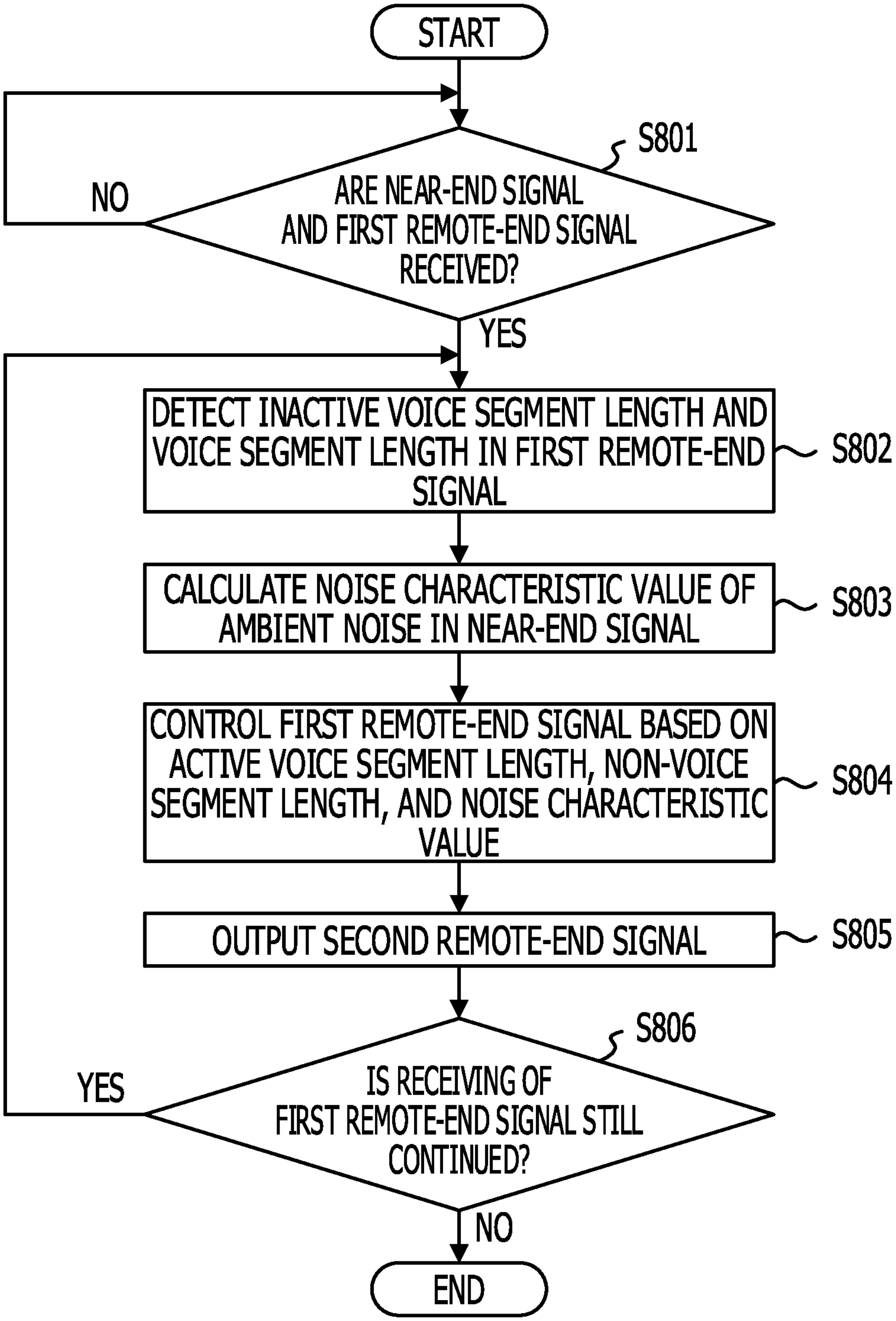
FIG. 8 is a flow chart illustrating a voice processing method executed by a voice processing device.

FIG. 8 is a flow chart illustrating a voice processing method executed by the voice processing device 1. The receiving unit 2 determines whether a near-end signal transmitted from a receiving side (a user of the voice processing device 1) and a first remote-end signal including an uttered voice transmitted from a transmitting side (a person communicating with the user of the voice processing device 1) are acquired from the outside (step S801). In a case where the determination made by the receiving unit 2 is that the near-end signal and the first remote-end signal are not received (No, in step S801), the determination process in step S801 is repeated. On the other hand, in a case where the determination made by the receiving unit 2 is that the near-end signal and the first remote-end signal are received (Yes, in step S801), the receiving unit 2 outputs the received first remote-end signal to the detection unit 3 and the control unit 5, and outputs the near-end signal to the calculation unit 4.

When the detection unit 3 receives the first remote-end signal from the receiving unit 2, the detection unit 3 detects a non-voice segment length and a voice segment length in the first remote-end signal (step S802). The detection unit 3 outputs the detected non-voice segment length and voice segment length in the first remote-end signal to the control unit 5.

When the calculation unit 4 receives the near-end signal from the receiving unit 2, the calculation unit 4 calculates a noise characteristic value of ambient noise included in the near-end signal (step S803). The calculation unit 4 outputs the calculated noise characteristic value of the ambient noise to the control unit 5. Hereinafter, the near-end signal will also be referred to as a third signal.

The control unit 5 receives the first remote-end signal from the receiving unit 2, the voice segment length and the non-voice segment length in the first remote-end signal from the detection unit 3, and the noise characteristic value from the calculation unit 4. The control unit 5 controls the first remote-end signal based on the voice segment length, the non-voice segment length, and the noise characteristic value, and the control unit 5 outputs a resultant signal as a second remote-end signal to the output unit 6 (step S804).

The output unit 6 receives the second remote-end signal from the control unit 5, and the output unit 6 outputs the second remote-end signal as an output signal to the outside (step S805).

The receiving unit 2 determines whether the receiving of the first remote-end signal is still being continuously performed (step S806). In a case where the receiving unit 2 is no longer continuously receiving the first remote-end signal (No, in step S806), the voice processing device 1 ends the voice processing illustrated in the flow chart of the FIG. 8. In a case where the receiving unit 2 is still continuously receiving the first remote-end signal (Yes, in step S806), the voice processing device 1 performs the process from steps S802 to S806 repeatedly.

Thus, the voice processing device according to the first embodiment is capable of improving the easiness for a listener to hear a voice.

Second Embodiment

In FIG. 3, the determination unit 7 may vary the control amount (non_sp) by an adjustment amount (r_delta) depending on a signal characteristic of the first remote-end signal. The signal characteristic of the first remote-end signal may be, for example, the noise characteristic value or the signal-to-noise ratio (SNR) of the first remote-end signal. The noise characteristic value may be calculated, for example, in a similar manner to the manner in which the calculation unit 4 calculates the noise characteristic value of the near-end signal. For example, the processing unit 9 may calculate the noise characteristic value of the first remote-end signal, and the determination unit 7 may receive the calculated noise characteristic value from the processing unit 9. The signal-to-noise ratio (SNR) may be calculated by the processing unit 9 using the ratio of the signal in a voice segment of the first remote-end signal to the noise characteristic value, and the determination unit 7 may receive the signal-to-noise ratio from the processing unit 9.

Figure 9:
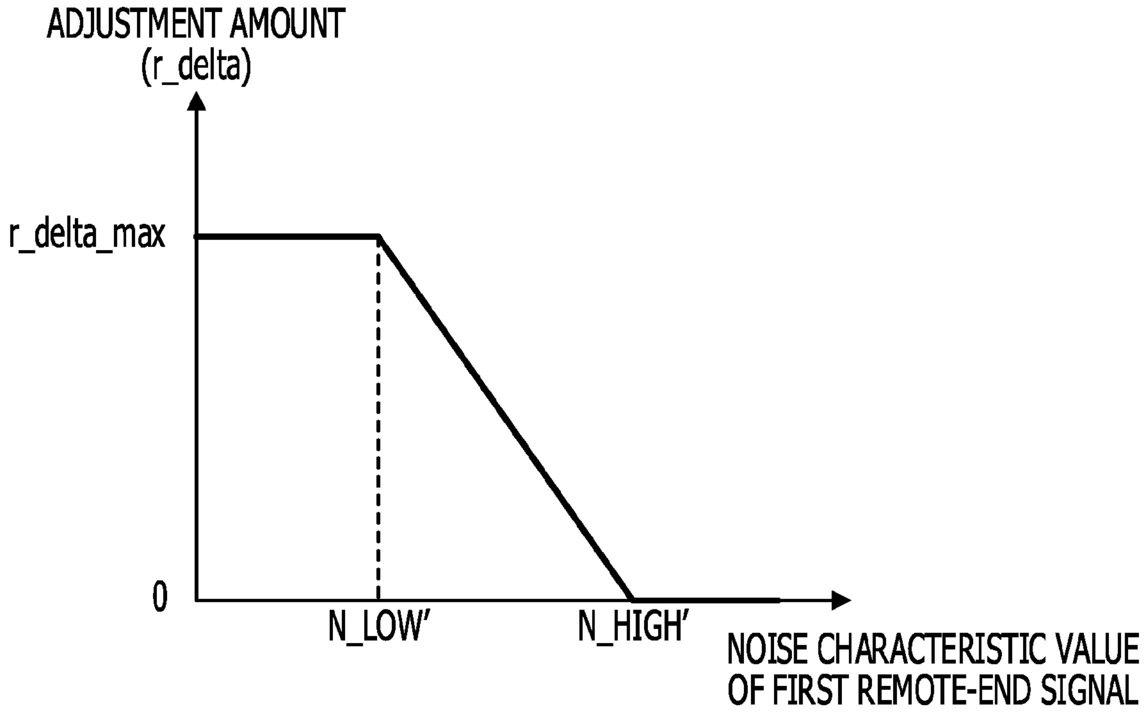
FIG. 9 is a diagram illustrating a relationship between an adjustment amount and a noise characteristic value of a first remote-end signal.
Figure 10:
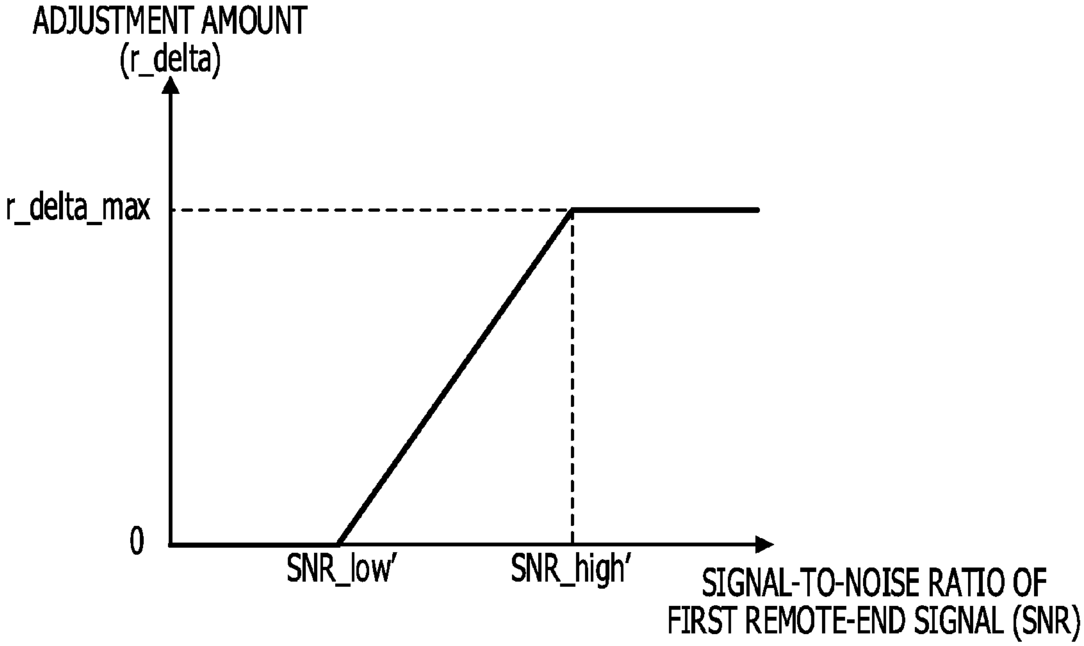
FIG. 10 is a diagram illustrating a relationship between an adjustment amount and a signal-to-noise ratio (SNR) of a first remote-end signal.

FIG. 9 is a diagram illustrating a relationship between the noise characteristic value of the first remote-end signal and the adjustment amount. In FIG. 9, r_delta_max indicates an upper limit of the adjustment amount of the control amount (non_sp) of the non-voice segment length. N_low' indicates an upper threshold value of the noise characteristic value for which the control amount (non_sp) is adjusted, and N_high' indicates a lower threshold value of the noise characteristic value for which the control amount (non_sp) of the non-voice segment length is not adjusted. FIG. 10 is a diagram illustrating a relationship between the signal-to-noise ratio (SNR) of the first remote-end signal and the adjustment amount. In FIG. 10, r_delta_max indicates an upper limit of the adjustment amount of the control amount (non_sp) of the non-voice segment length. SNR_high' indicates an upper threshold value of the signal-to-noise ratio for which the control amount (non_sp) is adjusted. SNR_low' indicates a lower threshold value of the signal-to-noise ratio for which the control amount (non_sp) of the non-voice segment is not adjusted. The determination unit 7 adjusts the control amount (non_sp) by adding the adjustment amount determined using either one of the relationship diagrams illustrated in FIGS. 9 and 10 to the control amount (non_sp).

In the two-way voice communication, the greater the noise in the first remote-end signal, the more the easiness of hearing at the receiving side may be reduced. In the voice processing device 1 according to the second embodiment, the adjustment amount is controlled in the above-described manner thereby improving the easiness for a listener to hear a voice.

Third Embodiment

In FIG. 3, in addition to the control information #1 (ctrl-1), the generation unit 8 may generate control information #2 (ctrl-2) for controlling the voice segment length based on the voice segment length and the delay. The process performed by the generation unit 8 to generate the control information #2 (ctrl-2) is described below. For the non-voice segment length, the generation unit 8 generates the control information #2 (ctrl-2), for example, such that ctrl-2=0.

Note that when ctrl-2=0, the control processing including the extension or the reduction is not performed on the voice segment of the first remote-end signal. For the voice segment length, the generation unit 8 generates the control information

Figure 11:
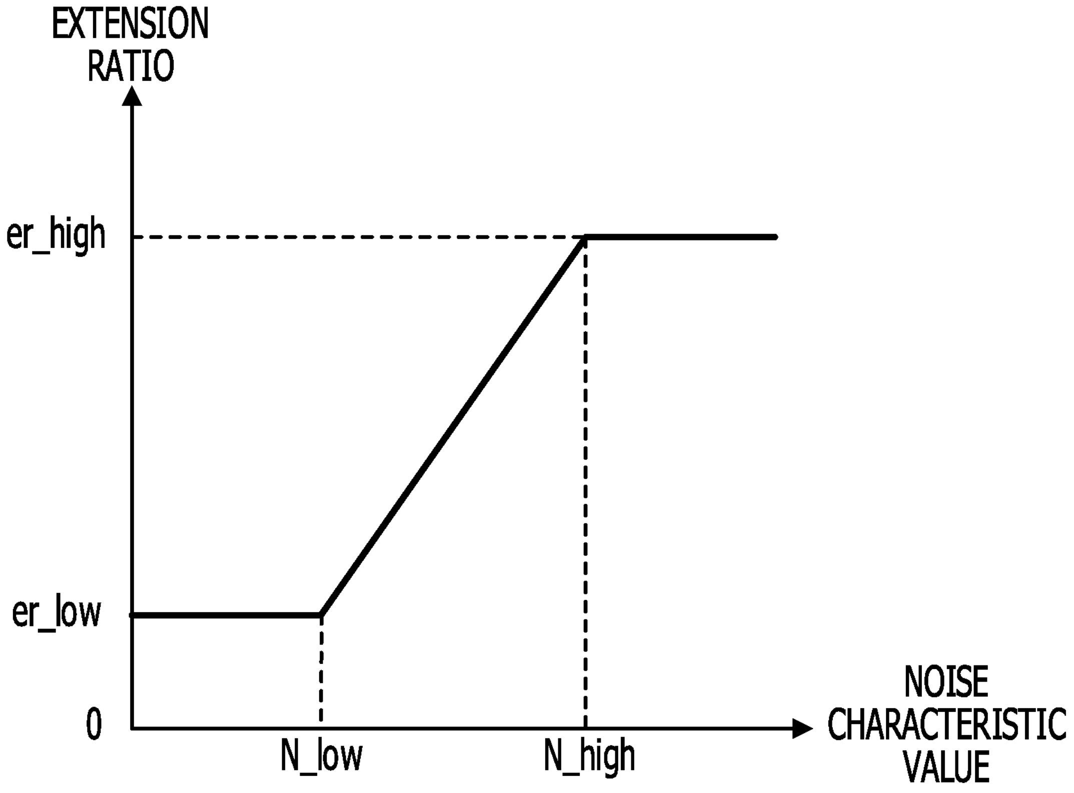
FIG. 11 is a diagram illustrating a relationship between a noise characteristic value and an extension ratio of a voice segment length.

#2 (ctrl-2) such that, for example, ctrl-2=er where er indicates the extension ratio of the voice segment. Note that even for the voice segment length, the generation unit 8 may generate the control information #2 (ctrl-2) such that ctrl-2=0 depending on the delay. The generation unit 8 outputs the resultant control information #2 (ctrl-2) to the processing unit 9. Next, a process of determining the extension ratio of the voice segment length is described below. FIG. 11 is a diagram illustrating a relationship between the noise characteristic value and the extension ratio of the voice segment length. The voice segment length is increased according to the extension ratio represented along the vertical axis in the relationship diagram of FIG. 11. In the relationship diagram in FIG. 11, er_high indicates an upper threshold value of the extension ratio (er), and er_low indicates a lower threshold value of the extension ratio (er). In the relationship diagram in FIG. 11, the extension ratio is determined based on the noise characteristic value of the near-end signal. This provides technically advantageous effects as described below.

As described above, when the speech rate is high (that is, the number of moras per unit time is large), this may cause a reduction in easiness for aged people to hear a speech. When there is ambient noise, a received voice may be masked by the ambient noise, which may cause a reduction in listening easiness for listeners regardless of whether the listeners are old or not old. In particular, in a situation in which a speech is made at a high speech rate in a circumstance where there is ambient noise, the high speech rate and the ambient noise lead to a synergetic effect that causes a great reduction in the listening easiness for aged people. On the other hand, in the two-way voice communication, if voice segments are increased without limitation, an increase in delay occurs which makes it difficult to communicate. In view of the above, the relationship diagram in FIG. 11 is set such that voice segments in which there is large ambient noise are preferentially extended thereby allowing it to increase the listening easiness while suppressing an increase in delay.

In FIG. 3, the processing unit 9 receives the control information #2 (ctrl-2) as well as the control information #1 (ctrl-1), the voice segment length, and the non-voice segment length from the generation unit 8. Furthermore, the processing unit 9 receives the first remote-end signal which is input to the control unit 5 from the receiving unit 2. The processing unit 9 outputs the delay, described in the first embodiment, to the generation unit 8. The processing unit 9 controls the first remote-end signal such that a non-voice segment is reduced or extended based on the control information #1 (ctrl-1) and a voice segment is reduced based on the control information #2 (ctrl-2). The processing unit 9 may perform the process of extending a voice segment, for example, by using a method disclosed in Japanese Patent No. 4460580.

In the voice processing device according to the third embodiment, in addition to controlling non-voice segment lengths, voice segment lengths are controlled depending on ambient noise thereby improving the easiness for a listener to hear a voice.

Fourth Embodiment

In the voice processing device 1 illustrated in FIG. 2, it is possible to improve the listening easiness for listeners by using only functions of the receiving unit 2, the detection unit 3, and the control unit 5, as described below. The receiving unit 2 acquires, from the outside, a first remote-end signal including an uttered voice transmitted from a transmitting side (a person communicating with a user of the voice processing device 1). Note that the receiving unit 2 may or may not receive a near-end signal transmitted from a receiving side (the user of the voice processing device 1). The receiving unit 2 outputs the received first remote-end signal to the detection unit 3 and the control unit 5.

The detection unit 3 receives the first remote-end signal from the receiving unit 2, and detects a non-voice segment length and a voice segment length in the first remote-end signal. The detection unit 3 may detect the non-voice segment length and the voice segment length in a similar manner as in the first embodiment, and thus a further description thereof is omitted. The detection unit 3 outputs the detected voice segment length and non-voice segment length in the first remote-end signal to the control unit 5.

The control unit 5 receives the first remote-end signal from the receiving unit 2, and the voice segment length and the non-voice segment length in the first remote-end signal from the detection unit 3. The control unit 5 controls the first remote-end signal based on the voice segment length and the non-voice segment length and outputs a resultant signal as a second remote-end signal to the output unit 6. More specifically, the control unit 5 determines whether the non-voice segment length is equal to or greater than a first threshold value above which it allowed for the listener at the receiving side to distinguish between words represented by respective voice segments. In a case where the non-voice segment length is smaller than the first threshold value, the control unit 5 controls the non-voice segment length such that the non-voice segment length is equal to or greater than the first threshold value. The first threshold value may be determined experimentally, for example, using a subjective evaluation. More specifically, for example, the first threshold value may be set to 0.2 seconds. Alternatively, the control unit 5 may analyze words in a voice segment using a known technique, and may control a period between words so as to be equal or greater than the first threshold value thereby achieving an improvement in listening easiness for the listener.

As described above, in the voice processing device according to the fourth embodiment, the non-voice segment length is properly controlled to increase the easiness for the listener to hear voices.

Fifth Embodiment

Figure 12:
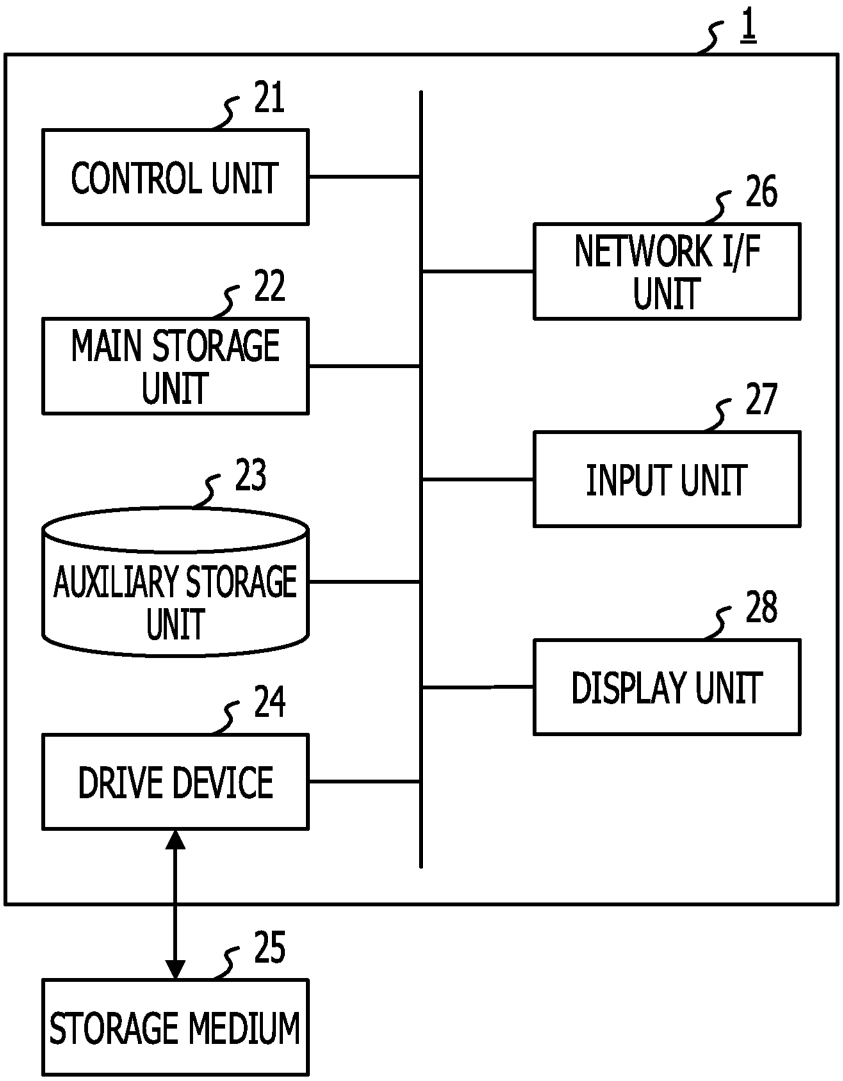
FIG. 12 is a diagram illustrating a hardware configuration of a computer functioning as a voice processing device according to an embodiment.

FIG. 12 illustrates a hardware configuration of a computer functioning as the voice processing device 1 according to an embodiment. As illustrated in FIG. 12, the voice processing device 1 includes a control unit 21, a main storage unit 22, an auxiliary storage unit 23, a drive device 24, a network I/F unit 26, an input unit 27, and a display unit 28. These units are connected to each other via bus such that it is allowed to transmit and receive data between the units.

The control unit 21 is a CPU that controls the units in the computer and also performs operations, processing, and the like on data. The control unit 21 also functions as an operation unit that executes a program stored in the main storage unit 22 or the auxiliary storage unit 23. That is, the control unit 21 receives data from the input unit 27 or the storage apparatus and performs an operation or processing on the received data. A result is output to the display unit 28, the storage apparatus, or the like.

The main storage unit 22 is a storage device such as a ROM, a RAM, or the like configured to store or temporarily store an operating system (OS) which is a basic software, a program such as application software, and data, for use by the control unit 21.

The auxiliary storage unit 23 is a storage apparatus such as an HDD or the like, configured to stored data associated with the application software or the like.

The drive device 24 reads a program from a storage medium 25 such as a flexible disk and installs the program in the auxiliary storage unit 23.

A particular program may be stored in the storage medium 25, and the program stored in the storage medium 25 may be installed in the voice processing device 1 via the drive device 24 such that the installed program may be executed by the voice processing device 1.

The network I/F unit 26 functions as an interface between the voice processing device 1 and a peripheral device having a communication function and connected to the voice processing device 1 via a network such as a local area network (LAN), a wide area network (WAN), or the like build using a wired or wireless data transmission line.

The input unit 27 includes a keyboard including a cursor key, numerical keys, various functions keys, and the like, a mouse or a slide pad for selecting a key on a display screen of the display unit 28. The input unit 27 functions as a user interface that allows a user to input an operation command or data to the control unit 21.

The display unit 28 may include a cathode ray tube (CRT), a liquid crystal display (LCD) or the like and is configured to display information according to display data input from the control unit 21.

The voice processing method described above may be realized by a program executed by a computer. That is, the voice processing method may be realized by installing the program from a server or the like and executing the program by the computer.

The program may be stored in the storage medium 25 and the program stored in the storage medium 25 may be read by a computer, a portable communication device, or the like thereby realizing the voice processing described above. The storage medium 15 may be of various types. Specific examples include a storage medium such as a CD-ROM, a flexible disk, a magneto-optical disk or the like capable of storing information optically, electrically, or magnetically, a semiconductor memory such as a ROM, a flash memory, or the like, capable of electrically storing information, and so on.

Sixth Embodiment

Figure 13:
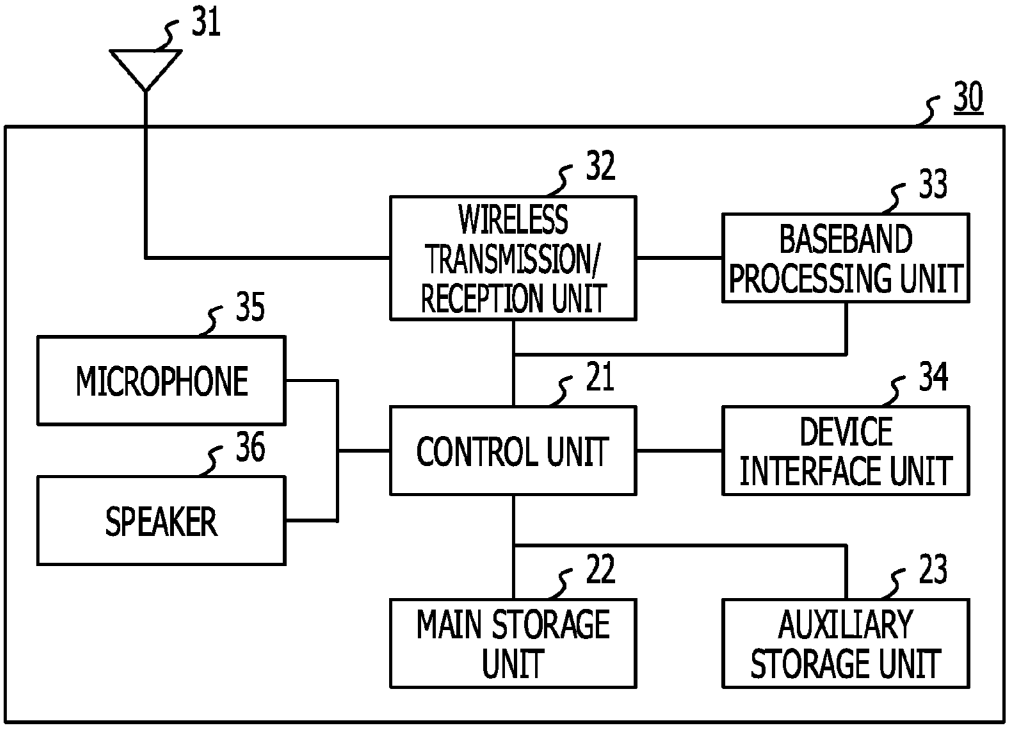
FIG. 13 is a diagram illustrating a hardware configuration of a portable communication device according to an embodiment.

FIG. 13 illustrates a hardware configuration functioning as a portable communication device 30 according to an embodiment. The portable communication device 30 includes an antenna 31, a wireless transmission/reception unit 32, a baseband processing unit 33, a control unit 21, a device interface unit 34, a microphone 35, a speaker 36, a main storage unit 22, and an auxiliary storage unit 23.

The antenna 31 transmits a wireless transmission signal amplified by a transmission amplifier, and receives a wireless reception signal from a base station. The wireless transmission/reception unit 32 performs a digital-to-analog conversion on a transmission signal spread by the baseband processing unit 33 and converts a resultant signal into a high-frequency signal by orthogonal modulation, and furthermore amplifies the high-frequency signal by a power amplifier. The wireless transmission/reception unit 32 amplifies the received wireless reception signal and performs an analog-to-digital conversion on the amplified signal. A resultant signal is transmitted to the baseband processing unit 33.

The baseband processing unit 33 performs baseband processes including addition of error correction code to the transmission data, data modulation, spread modulation, inverse spread modulation of the received signal, determination of the receiving environment, determination of a threshold value of each channel signal, error correction decoding, and the like.

The control unit 21 controls a wireless transmission/reception process including controlling transmission/reception of a control signal. The control unit 21 also executes a voice processing program stored in the auxiliary storage unit 23 or the like to perform, for example, the voice processing according to the first embodiment.

The main storage unit 22 is a storage device such as a ROM, a RAM, or the like configured to store or temporarily store an operating system (OS) which is a basic software, a program such as application software, and data, for use by the control unit 21.

The auxiliary storage unit 23 is a storage device such as an HDD, an SSD, or the like, configured to stored data associated with the application software or the like.

The device interface unit 34 performs a process to interface with a data adapter, a handset, an external data terminal, or the like.

The microphone 35 senses an ambient sound including a voice of a talker, and outputs the sensed sound as a microphone signal to the control unit 21. The speaker 36 outputs a signal received from the control unit 21 as an output signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice processing device comprising:

a memory; and a processor coupled to the memory and configured to:

receive a remote end signal including a plurality of voice segments and at least one non-voice segment;

detect a voice segment length and a non-voice segment length in the remote end signal;

receive a near-end signal including ambient noise through a microphone;

calculate a noise characteristic value of the ambient noise included in the near-end signal;

control the remote end signal based on the voice segment length, the non-voice segment length, and a magnitude of the noise characteristic value, such that the non-voice segment has a length equal to or greater than a predetermined first threshold value and exists between at least two of the plurality of voice segments; and output a signal including the plurality of voice segments and the controlled non-voice segment to a speaker device.

2. The device according to claim 1, wherein the processor is further configured to control the non-voice segment length such that in a case where the non-voice segment length is smaller than the first threshold value, the non-voice segment length is extended depending on the magnitude of the noise characteristic value.

3. The device according to claim 2, wherein the processor is further configured to control an extension ratio or a reduction ratio of the non-voice segment length based on a difference between a reception amount of the received remote end signal and an output amount of the outputted signal.

4. The device according to claim 1,
wherein the processor is further configured to control the non-voice segment length such that in a case where the non-voice segment length is equal to or greater than the first threshold value, the non-voice segment length is reduced depending on the magnitude of the noise characteristic value.

5. The device according to claim 1,
wherein the processor is further configured to extend the voice segment length depending on the magnitude of the noise characteristic value.

6. The device according to claim 1,
wherein the processor is further configured to calculate the noise characteristic value based on a power fluctuation of the near-end signal over a predetermined period of time.

7. A voice processing method comprising:
receiving a remote end signal including a plurality of voice segments and at least one non-voice segment;
detecting, by a processor, a voice segment length and a non-voice segment length in the remote end signal;
receiving a near-end signal including ambient noise through a microphone;
calculating, by the processor, a noise characteristic value of the ambient noise included in the near-end signal;
controlling, by the processor, the remote end signal on the voice segment length, the non-voice segment length, and a magnitude of the noise characteristic value, such that the non-voice segment has a length equal to or greater than a predetermined first threshold value and exists between at least two of the plurality of voice segments; and
outputting a signal including the plurality of voice segments and the controlled non-voice segment to a speaker device.

8. The method according to claim 7,
wherein the controlling controls the non-voice segment length so as to be equal to or greater than the first threshold value.

9. The method according to claim 8,
wherein the controlling extends the voice segment length depending on the magnitude of the noise characteristic value.

10. The method according to claim 8,
wherein the calculating calculates the noise characteristic value based on a power fluctuation of the near-end signal over a predetermined period of time.

11. The method according to claim 7,
wherein the controlling controls the non-voice segment length such that in a case where the non-voice segment length is smaller than the first threshold value, the non-voice segment length is extended depending on the magnitude of the noise characteristic value.

12. The method according to claim 11,
wherein the controlling controls an extension ratio or a reduction ratio of the non-voice segment length based on a difference between a reception amount of the remote end signal received by the receiving and an output amount of the signal output by the outputting.

13. The method according to claim 7,
wherein the controlling controls the non-voice segment length such that in a case where the non-voice segment length is equal to or greater than the first threshold value, the non-voice segment length is reduced depending on the magnitude of the noise characteristic value.

14. A non-transitory computer-readable storage medium storing a voice processing program that causes a computer to execute a process comprising:
receiving a remote end signal including a plurality of voice segments and at least one non-voice segment;
detecting a voice segment length and a non-voice segment length in the remote end signal;
receiving a near-end signal including ambient noise through a microphone;
calculating a noise characteristic value of the ambient noise included in the near-end signal;
controlling the remote end signal based on the voice segment length, the non-voice segment length, and a magnitude of the noise characteristic value, such that the non-voice segment has a length equal to or greater than a predetermined first threshold value and exists between at least two of the plurality of voice segments; and
outputting a signal including the plurality of voice segments and the controlled non-voice segment to a speaker device.

* * * * *